United States Patent
Chen et al.

(10) Patent No.: US 10,585,845 B2
(45) Date of Patent: Mar. 10, 2020

(54) SYSTEMS AND METHODS FOR CREATING AND USING A DATA STRUCTURE FOR PARALLEL PROGRAMMING

(71) Applicant: Futurewei Technologies, Inc., Plano, TX (US)

(72) Inventors: Liya Chen, San Jose, CA (US); Chen Tian, Union City, CA (US); Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 72 days.

(21) Appl. No.: 15/293,413

(22) Filed: Oct. 14, 2016

(65) Prior Publication Data

US 2017/0124020 A1    May 4, 2017

Related U.S. Application Data (60) Provisional application No. 62/249,750, filed on Nov. 2, 2015.

(51) Int. Cl.
  *G06F 9/44* (2018.01)
  *G06F 15/173* (2006.01)
  (Continued)

(52) U.S. Cl.
  CPC ........ *G06F 15/17318* (2013.01); *G06F 8/314* (2013.01); *G06F 9/3009* (2013.01);
  (Continued)

(58) Field of Classification Search
  CPC .......... G06F 9/546; G06F 9/524; G06F 9/445; G06F 9/50; G06F 9/3009; G06F 9/30036; G06F 15/17318; G06F 8/314
  See application file for complete search history.

(56) References Cited

U.S. PATENT DOCUMENTS 6,138,123 A    10/2000 Rathbun
7,117,502 B1 *  10/2006 Harris ..................... G06F 9/524
                                                        719/315

(Continued)

OTHER PUBLICATIONS

Lu et al., MrPhi an Optimized MapReduce Framework on Intel Xeon Phi Coprocessors, Nov. 2015 (Year: 2015).*

(Continued)

*Primary Examiner* — Lewis A Bullock, Jr.
*Assistant Examiner* — Tina Huynh
(74) *Attorney, Agent, or Firm* — Slater Matsil, LLP (57) ABSTRACT

System and method embodiments are provided for creating data structure for parallel programming. A method for creating data structures for parallel programming includes forming, by one or more processors, one or more data structures, each data structure comprising one or more global containers and a plurality of local containers. Each of the global containers is accessible by all of a plurality of threads in a multi-thread parallel processing environment. Each of the plurality of local containers is accessible only by a corresponding one of the plurality of threads. A global container is split into a second plurality of local containers when items are going to be processed in parallel and two or more local containers are merged into a single global container when a parallel process reaches a synchronization point.

24 Claims, 8 Drawing Sheets

(51) Int. Cl.
*G06F 9/50* (2006.01)
*G06F 9/52* (2006.01)
*G06F 8/30* (2018.01)
*G06F 9/30* (2018.01)
*G06F 9/445* (2018.01)

(52) U.S. Cl.
CPC .......... *G06F 9/30036* (2013.01); *G06F 9/445* (2013.01); *G06F 9/50* (2013.01); *G06F 9/524* (2013.01)

(56) References Cited

U.S. PATENT DOCUMENTS

| | | | |
|---|---|---|---|
| 7,571,439 B1 | 8/2009 | Rabinovici et al. | |
| 7,600,221 B1* | 10/2009 | Rangachari | G06F 9/3808 |
| | | | 712/215 |
| 7,836,033 B1 | 11/2010 | Moorthi et al. | |
| 9,582,312 B1* | 2/2017 | Karppanen | G06F 9/461 |
| 2004/0181504 A1* | 9/2004 | Chang | G06F 16/9024 |
| 2009/0037501 A1 | 2/2009 | Nishiyama et al. | |
| 2009/0265530 A1* | 10/2009 | Guo | G06F 9/3004 |
| | | | 712/227 |
| 2011/0088020 A1* | 4/2011 | Eichenberger | G06F 8/456 |
| | | | 717/149 |
| 2012/0311606 A1* | 12/2012 | Marathe | G06F 9/526 |
| | | | 718/107 |
| 2014/0095812 A1* | 4/2014 | McLachan | G06F 12/023 |
| | | | 711/154 |
| 2016/0062776 A1* | 3/2016 | Stanfill | G06F 8/43 |
| | | | 719/331 |

OTHER PUBLICATIONS

Vaughan et al., Cilk++ Breadth First Search Final Report, Mar. 22, 2012 (Year: 2012).*
Intel® Cilk Plus Language Specification, Part 1 of the Intel® Cilk Plus Language Specification Version 0.9, Revision: 1.0, Intel Corporation, 2010, 38 pages.
Intel® Threading Building Blocks, Containers, available at: https://www.threadingbuildingblocks.org/docs/help/hh_goto.htm#tbb_userguide/Containers.htm, downloaded Sep. 7, 2016, 1 page.
Intel® Threading Building Blocks, concurrent_vector, available at: https://www.threadingbuildingblocks.org/docs/help/hh_goto.htm#tbb_userguide/concurrent_vector_ug.htm, downloaded Sep. 7, 2016, 1 page.
Leiserson, C. et al., "A Work-Efficient Parallel Breadth-First Search Algorithm (or How to Cope with the Nondeterminism of Reducers)," MIT Computer Science and Articial Intelligence Laboratory, 2010, 12 pages.
De Vega, et al., "An efficient parallel set container for multicore architectures," International Conference on Parallel Computing 2011,Sep. 30, 2011, XP055499147, 8 pages.

* cited by examiner

402 — #include <hare_bSack.h>

404 — class userClass : public sackItem {

...
}

406 — Parallel_task(){

.....

408 — e=s->get(); //e is of type userClass

....

410 — s->put(e);// e is of type userClass

502 — //Main.cpp:

504 — c =hare_create_task_container(FIFO_DIST, NON_SP);
506 — g =hare_create_thread_group(num_thread, c);
508 — s =new Sack(g);
510 — while (!s->empty()) {
512 —   s->split();
514 —   for (int ;=0; i<num_thread; i++) {
            hare_create_task(parallel_task, (task_arg_t)NULL, c);
        }
516 —   hare_sync(g);
518 —   s->merge();
        }

SYSTEMS AND METHODS FOR CREATING AND USING A DATA STRUCTURE FOR PARALLEL PROGRAMMING

This application claims the benefit of U.S. Provisional Application No. 62/249,750, filed on Nov. 2, 2015, titled "System and Method for a Data Structure for Parallel Programming," which application is hereby incorporated by reference.

TECHNICAL FIELD

The present invention relates to a system and method for parallel programming, and, in particular embodiments, to a system and method for a data structure for parallel programming.

BACKGROUND

Parallel program is more difficult to write than sequential ones. There are many approaches of parallel framework in recent decades. The popular ones are CILK™, CILK™Plus, Intel®Threading Building Blocks (TBB), OpenMP® and others. These parallel frameworks provide extended library and runtime support for C/C++ language and can achieve performance improvement in many aspects. However, most of the data structures used in the above parallel programming frameworks are still traditional common ones. Some of them provide parallel data structure solutions, but these approaches are all bundled to certain runtime systems with fixed implementation. The performance of some of these solutions is often poor. Furthermore, it is difficult to debug these systems for parallel programming.

SUMMARY

An embodiment method in a data processing system for creating data structures for parallel programming includes forming, by one or more processors, one or more data structures, each data structure comprising one or more global containers and a plurality of local containers. Each global container is accessible by all of a plurality of threads in a multi-thread parallel processing environment. Each of the plurality of local containers is accessible only by a corresponding thread. The method includes splitting the global container into a second plurality of local containers when items are going to be processed in parallel. The method also includes merging two or more local containers into a single global container when a parallel process reaches a synchronization point.

An embodiment data processing system for creating data structures for parallel programming includes one or more processors and a non-transitory computer readable storage medium storing programming for execution by the processor. The programming includes instructions for forming, by one or more processors, one or more data structures. Each data structure includes one or more global containers and a plurality of local containers. Each global container is accessible by all of a plurality of threads in a multi-thread parallel processing environment. Each of the plurality of local containers is accessible only by a corresponding thread. The programming also includes instructions for splitting the global container into a second plurality of local containers when items are going to be processed in parallel. The programming also includes instructions for merging two or more local containers into a single global container when a parallel process reaches a synchronization point.

An embodiment non-transitory computer-readable media storing computer instructions for creating data structures for parallel programming is provided, that when executed by one or more processors, cause the one or more processors to perform the step of forming one or more data structures, each data structure comprising one or more global containers and a plurality of local containers. Each global container is accessible by all of a plurality of threads in a multi-thread parallel processing environment. Each of the plurality of local containers is accessible only by a corresponding thread. The computer instructions for utilizing a parallel programming framework, that when executed by one or more processors, also cause the one or more processors to perform the step of splitting the global container into a second plurality of local containers when items are going to be processed in parallel. The computer instructions for utilizing a parallel programming framework, that when executed by one or more processors, also cause the one or more processors to perform the step of merging two or more local containers into a single global container when a parallel process reaches a synchronization point.

In any of the embodiments disclosed herein, the one or more global containers and the plurality of local containers support a set of access methods to the data structure that include one or more of a put( ) method or a push( ) method, a get( ) method or a pop( ) method, a split( ) method, and a merge( ) method. In an embodiment, the data structure is array-based, and wherein the supporting a set of access methods includes supporting the push( ) and pop( ) methods. In an embodiment, the data structure is bit vector-based, and wherein the supporting a set of access methods includes supporting the put( ) and get( ) methods. In an embodiment, a local container of the plurality of local containers includes a trace identifier (tid), a start index, and an end index. In an embodiment, executing instructions provided by the one or more global containers and the plurality of local containers to obtain a result and transmitting the result to a node in a network or causing the data processing system to present one or more images, a sound, or a vibration to a user, wherein the result comprises path information for a path across a network from a source node to an end node, and wherein transmitting to a node in the network comprises transmitting at least a portion of the path information to a node in the network, the path information causing the node to facilitate transmitting data from the source node to the end node. In an embodiment, the one or more processors includes a multi-core processor. In an embodiment, the one or more global containers and the plurality of local containers include a respective serial common data structure.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

There are several similar prior approaches in parallel programming frameworks, such as TBB and CILK™. Various ones of these techniques are described below.

Reducers and array notation in CILK™ are two data structures that are bundled with CILK™/CILK™ Plus runtime. The reducer of CILK™ corresponds to the reduction clause in OpenMP or to the algebraic notion of a monoid. Each reducer has an identity element and an associative reduce operation that combines two values.

Intel CILK™ Plus adds notation to an array that allow users to express high-level operations on entire arrays or sections of arrays; this also helps the compiler to effectively vectorize the application. In short, CILK™ Plus provides a reduced version of the basic data structure, not specific for any algorithm [1]. A performance comparison between these solutions with common data structure does not appear to be available.

Intel® Threading Building Blocks (Intel® TBB) provides concurrent container classes that permit multiple threads to simultaneously invoke certain methods on the same container. The concurrent containers in TBB include concurrent map/set/queue/vector.

All the above data structures are bundled with TBB template library and runtime [2]. Some methods for accessing these containers, for example, push( ) in concurrent_queue, require C++11 language features that may not suitable for embedded system development.

Also, caution is needed when using some of these data structures. As indicated by a TBB official document, users need be aware of using concurrent vectors; and the iterating accesses of a concurrent queue is intend for debugging only [3].

Some researchers have proposed a concurrent data structure called BAG for the breadth-first searching (BFS) algorithm. The BAG data structure is known in the art. The BAG data structure is a data structure for parallel computing proposed by MIT which is bundled with CILK™runtime. It requires the CILK™reducer and therefore uses a divide and conquer strategy to perform partition. Also, the concurrent data structure BAG itself has a specific implementation using a pennant based complete binary tree [4].

An embodiment provides a data structure, referred to herein as "Sack", for a parallel programming environment that facilitates implementing an algorithm using multiple threads. Sack is a data structure for parallel computing that includes both global containers and local containers. The data structure Sack has global and local containers for a parallel programming system. The global and local containers can be implemented as any common data structure (CDS). The CDSs of both the global containers and the local containers may be a serial CDS. The CDS of a local container may be the same as or different from the CDS of another local container and may be the same as or different from the CDS of a global container. Similarly, the CDS of a global container may be the same or different from the CDS of another global container. CDSs are well known to those of ordinary skill in the art. A CDS may be any traditional sequential data structure. The CDS in the Sack is bundled with an internal runtime environment. The internal runtime environment can be any internal runtime environment. As used herein, for purposes of describing the Sack, in an embodiment, bundling the CDS to an internal runtime environment means that the implementation of certain features of Sack, such as inserting a data element to a global or local container or reading a data element from a global or local container, are based on a runtime function. Different internal runtime environments have different commands and different procedures for executing these commands. A global container includes a CDS that is accessible by all threads in a data processing system. A local container includes a CDS that is accessible only by a single local thread. Each thread may have its own corresponding local container.

Unlike a Bag data structure, embodiments of Sack may be bundled with any runtime environment and are not limited to CILK™. Furthermore, Sack does not require a pennant-based complete binary tree. The Sack data structure enables a programmer to write code in a similar manner as would be done for serial programs, while enabling parallel computing. The disclosed data structures also ensure that different threads do not access or interfere with the data of other threads, while also allowing data to be shared by threads when synchronization of data is required by the algorithm executed by the plurality of threads.

The Sack data structure is suitable for a breadth first search (BFS) algorithm, which is widely used in path calculating elements (PCEs) in routers and in software defined networks (SDNs). It provides trace data for BFS-related applications when needed. Furthermore, the underlying implementation of Sack can use any existing common data structure. The underlying implementation of Sack may include global and local containers that use the same or different common data structures. Embodiments of Sack provide debug and trace capability when working with the BFS algorithm. Embodiments may be utilized for a parallel runtime system using single-node multicore processors, such as in a PCE device/component in a fixed network, in an SDN, or in other products that include a heavy computation unit. Embodiments may also be used in data processing systems employing multiple processors and those employing multiple multicore processors.

An embodiment method for utilizing a parallel programming framework includes a processor forming a data structure comprising a global container and a plurality of local containers, wherein the global container is accessible by all threads, and wherein each of the plurality of local containers is accessible only by a respective thread. The method further includes the processor supporting a set of access methods to the data structure including a put( ) method or push( ) method, a get( ) method or pop( ) method, a split( ) method, and a merge( ) method.

An embodiment system having a parallel programming framework includes a processor and a non-transitory computer readable storage medium storing programming for execution by the processor. The programming includes instructions for forming a data structure comprising a global container and a plurality of local containers, wherein the global container is accessible by all threads, and wherein each of the plurality of local containers is accessible only by a respective thread. The programming further includes instructions for supporting a set of access methods to the data structure, including a put( ) method or push( ) method, a get( ) method or pop( ) method, a split( ) method, and a merge( ) method, for example.

An embodiment method in a data processing system for utilizing a parallel programming framework includes forming, by one or more processors, one or more data structures. Each data structure comprises one or more global containers and/or one or more local containers. The global container is accessible by all of a plurality of threads in a multi-thread parallel processing environment. Each of the plurality of local containers is accessible only by a corresponding thread. The one or more global containers and the local containers include a respective common data structure (CDS) bundled to a run-time environment. The method includes splitting the global container into a plurality of local containers when items are going to be processed in parallel. The method also includes merging two or more local containers into a single global container when a parallel process reaches a synchronization point. The method also includes executing instructions provided by the one or more global containers and the one or more local containers to obtain a result. The method also includes transmitting the result to a node in a network or causing the data processing system to present one or more images, a sound, or a vibration to a user.

In an embodiment, the one or more global containers and/or the one or more local containers support a set of access methods to the data structure that include one or more of a put( ) method or a push( ) method, a get( ) method or a pop( ) method, a split( ) method, and a merge( ) method, for example. In an embodiment, the data structure is array-based, and wherein the supporting a set of access methods includes supporting the push( ) and pop( ) methods. In an embodiment, the data structure is bit vector-based, and wherein the supporting a set of access methods includes supporting the put( ) and get( ) methods. In an embodiment, the local container includes a trace identifier (tid), a start index, and an end index. In an embodiment, the result comprises path information for a path across a network from a source node to an end node, and wherein transmitting to a node in the network comprises transmitting at least a portion of the path information to a node in the network, the path information causing the node to facilitate transmitting data from the source node to the end node. In an embodiment, the one or more processors includes a multi-core processor.

An embodiment data processing system having a parallel programming framework includes one or more processors and a non-transitory computer readable storage medium storing programming for execution by the processor. The programming includes instructions for forming, by one or more processors, one or more data structures. Each data structure includes one or more global containers and/or one or more local containers. The global container is accessible by all of a plurality of threads in a multi-thread parallel processing environment. Each of the plurality of local containers is accessible only by a corresponding thread. The one or more global containers and the local containers include a respective common data structure bundled to a run-time environment. The programming also includes instructions for splitting the global container into a plurality of local containers when items are going to be processed in parallel. The programming also includes instructions for merging two or more local containers into a single global container when a parallel process reaches a synchronization point. A "synchronization point" refers to the moment when all parallel threads need to synchronize their data. It is determined by the algorithm being implemented, using the disclosed Sack data structures. For example, in Breath First Searching, threads work in parallel when relaxing same level of edges. After all the edges are processed and before processing the next level of data, the data needs to be synchronized. Thus, a merge process of the local containers into a global container will be performed.

A Sack may be implemented using, for example, an array-based complex CDS or a bit vector-based complex CDS. An array-based complex CDS based Sack system is referred to as an aSack and a bit vector-based complex CDS is referred to as a bSack. Both an aSack and a bSack comprise Sack data structures.

The programming also includes instructions for executing instructions provided by the one or more global containers and the one or more local containers to obtain a result. The programming also includes instructions for transmitting the result to a node in a network or causing the data processing system to present one or more images, a sound, or a vibration to a user.

An embodiment non-transitory computer-readable media storing computer instructions for utilizing a parallel programming framework is provided, that when executed by one or more processors, cause the one or more processors to perform the step of forming one or more data structures each data structure comprising one or more global containers and/or one or more local containers. The global container is accessible by all of a plurality of threads in a multi-thread parallel processing environment. Each of the plurality of local containers is accessible only by a corresponding thread. The one or more global containers and the local containers include a respective common data structure bundled to a run-time environment. The computer instructions for utilizing a parallel programming framework, that when executed by one or more processors, also cause the one or more processors to perform the step of splitting the global container into a plurality of local containers when items are going to be processed in parallel. The computer instructions for utilizing a parallel programming framework, that when executed by one or more processors, also cause the one or more processors to perform the step of merging two or more local containers into a single global container when a parallel process reaches a synchronization point. The computer instructions for utilizing a parallel programming framework, that when executed by one or more processors, also cause the one or more processors to perform the step of executing instructions provided by the one or more global containers and the one or more local containers to obtain a result. The computer instructions for utilizing a parallel programming framework, that when executed by one or more processors, also cause the one or more processors to perform the step of transmitting the result to a node in a network or causing the data processing system to present one or more images, a sound, or a vibration to a user.

Figure 1:
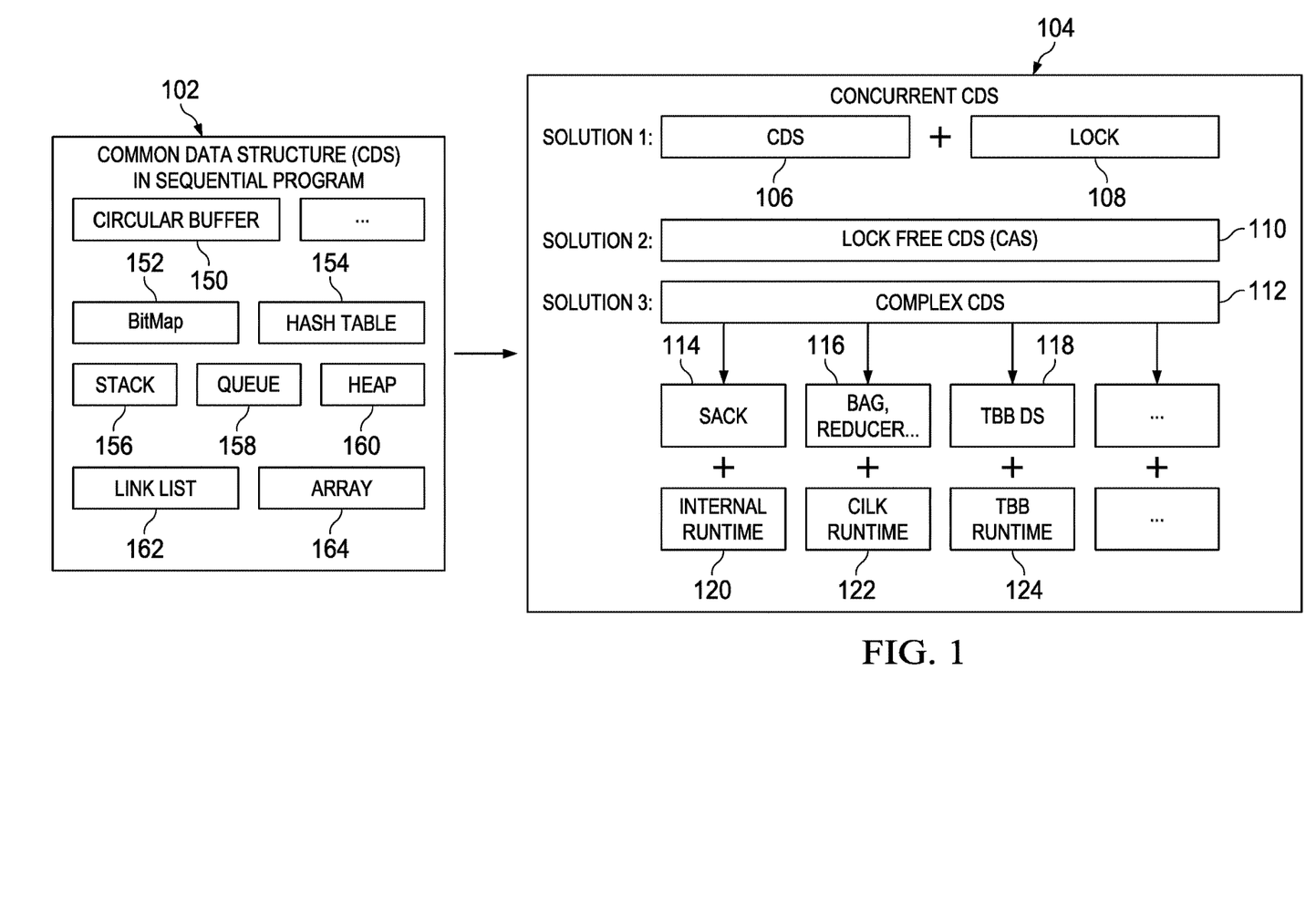
FIG. 1 illustrates a sequential common data structure (CDS) and a plurality of data structure solutions for a parallel programming environment including an embodiment of a concurrent CDS with the disclosed Sack data structure.

FIG. 1 illustrates a common data structure used in sequential programs, and a plurality of data structure solutions for a parallel programming environment. The data structure solutions include the disclosed Sack 114 discussed in more detail below. The data structure solutions also include several prior art methods—a bag reducer 116 and a TBS DS 118. In an embodiment, a common data structure (CDS) 102 may include a circular buffer 150, a bitmap 152, a hash table 154, a stack 156, a queue 158, a heap 160, a link list 162, and an array 164. In other embodiments, the CDS 102 may include more, fewer, or different components.

Box 104 shows several different solutions for using the CDS 102 in a parallel programming environment. Solution 1 couples the CDS 106 with a lock 108. Solution 2 is a lock-free CDS (CAS) 110. Solution 3 is a complex CDS 112. Several examples of complex CDSs 112 are shown below the complex CDS 112. One complex CDS 112 is an embodiment of the disclosed Sack 114 which is bundled with an internal runtime environment 120. Another example of a complex CDS 112 is a bag reducer 116 bundled with a CILK™ runtime environment 122. Another example is a TBB DS 118 bundled with a TBB runtime environment 124.

An embodiment Sack concurrent data structure may include global and local containers as well as a defined set of access methods. Definition 1 defines the Sack by thread associations. In a Definition 1 embodiment, a global container or containers may be accessed by all threads, while each local container may only be accessed by an associated particular thread. The set of access methods may include put( ) or push( ), get( ) or pop( ), split( ), and merge( ), for example.

Definition 2 defines the Sack by access methods. In Definition 2, global containers and local containers are still implemented independently of each other in a Sack implementation. In addition, in Definition 2, put( ) and get ( ) are methods to put and retrieve an element for a bSack implementation of the disclosed data structures. Push( ) and pop( ) are methods to put and retrieve an element for an aSack implementation of the disclosed data structures. Values are inserted into a Sack by a put( ) or push( ) method when needed. The need for inserting a value into a Sack (for both aSack and bSack) is determined by the user's algorithm. Similarly, values are read out from a Sack by a get( ) or pop( ) method when needed, and such need is also defined by the user's algorithm.

With respect to Definition 1, the container that is used in runtime depends on the flag value in the Sack class. Default is using the global container. When a split( ) access method, which is discussed below, is applied, the flag is set to use the local container. A split( ) access method is applied when each layer starts in a BFS algorithm.

Both the global and local containers may be implemented by the same or different common data structures per a user's preferences and per the nature of the problem addressed by the program. For example, the common data structure used to implement a global container may be different from a CDS used to implement a local container. Furthermore, the common data structure used to implement a first local container may be different from the common data structure used to implement a second local container.

With respect to Definition 2, the use of put( ) or push( ) depends on the underlying implementation to select which access method to use. The put( ) or push( ) access method adds/copies an element into Sack. Typically, put( ) is used for unordered containers, while push( ) is used for ordered containers.

The use of get( ) or pop( ) depends on the underlying implementation to select which access method is to be used. The get( ) or pop( ) access method retrieves/copies an element from Sack. The get( ) is used for unordered containers, while pop( ) is used for ordered containers.

The split( ) access method/instruction divides the global container into local containers with equal or almost equal parts. After a split( ) operation, all threads have access to the resulting local containers. In an embodiment, the threads have access to the resulting local containers, but each thread can only access a local container attached to it, and no others.

The merge( ) instruction merges data from local containers into a global container. During this process, all repeated/duplicated data are removed. After the merge( ) operation, all threads have access to the resulting global container. In an embodiment, a merge( ) operation occurs when all elements in a current layer have been processed in a BFS algorithm.

Implementations are flexible, based on different common data structures. For example, Sack may be implemented with a standard array or a queue.

In an embodiment, there can be multiple local containers where at least some of the local containers are different from other local containers.

Provided herein, aSack is an array based implementation of global and/or local containers. An aSack implementation supports push( ) and pop( ) methods, which are first-in, first-out (FIFO) style methods.

Figure 2:
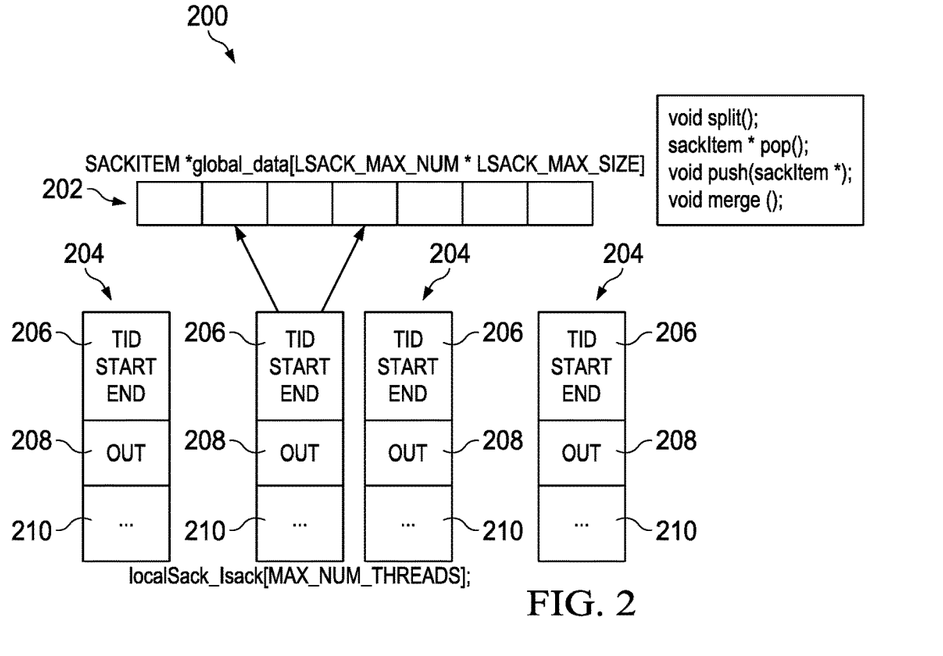
FIG. 2 is a diagram that illustrates an embodiment of an aSack system of an array based complex CDS.

FIG. 2 is a diagram that illustrates an embodiment of an aSack system 200 for an array-based complex CDS. System 200 in this example includes a global container 202 and a plurality of local containers 204. Each local container 204 in this example includes a header 206, an output section 208, and data section 210. The term "sackItem*global_data[LSACK_MAX_NUM*LSAC_MAX_SIZA]" is an example of a global container of aSack implemented by an array. The two parameters in the H indicate the maxima size of this array. The term "localSack_Isack[MAX_NUM_THREADS]" is an example of local container of aSack implemented by array. The parameter in [ ] indicates the number of local containers, which is equal to the number of threads. The header 206 includes tid, s, and e fields. The tid field is the thread identifier, the s field is the start index, and the e field is the end index. Output section 208 contains the output data. The data section 210 includes other data and routines contained in the local container 204. The header 206 also specifies what is in the particular local container 204. Each local container 204 is accessible by only one thread and is uniquely associated with that thread. Each of the global containers 202 is accessible by all threads. The arrows from one of the local containers 204 to various global containers indicate the start and end index in the local container corresponds to a global container.

Figure 3:
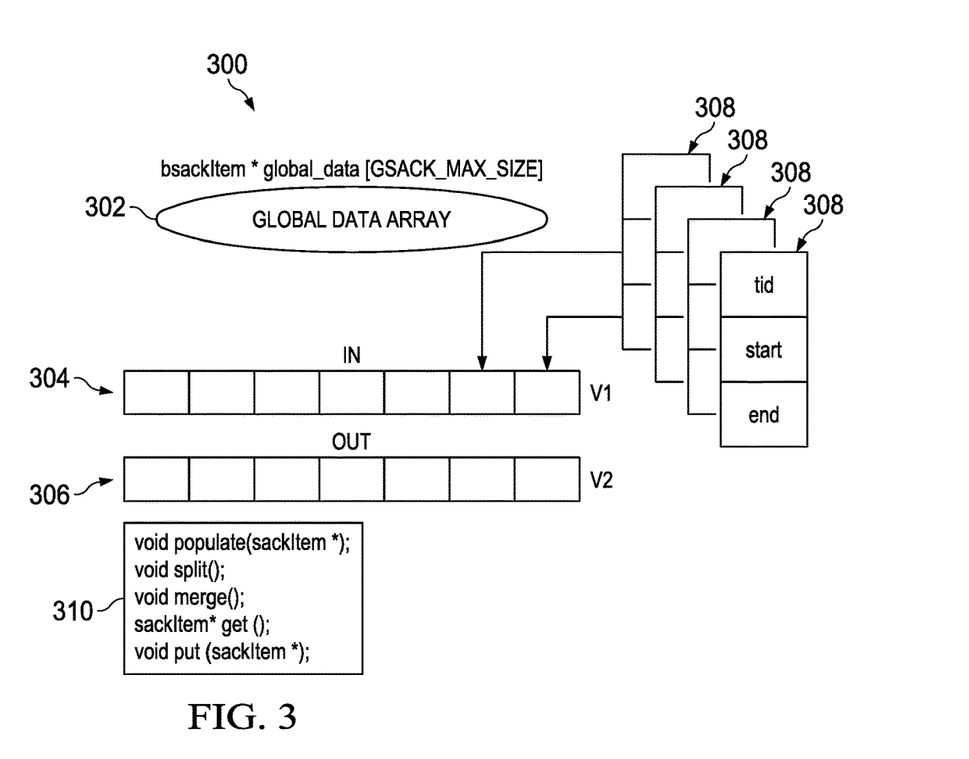
FIG. 3 is a diagram that illustrates an embodiment of a bSack system for a bit vector based complex CDS.

FIG. 3 is a diagram that illustrates an embodiment of a bSack system 300 for a bit vector based complex CDS. The system 300 includes a global data array 302, vector 304, labeled v1, vector 306, labeled v2, a plurality of local containers 308, and access methods 310 for the bSack. The bSack system 300 supports put( ) and get( ) methods. The global data array 302 is a global container that is accessible by all threads. The local containers 308 are local vectors that include a tid which is a thread id, a start point, and an end point that correspond to the points in the global vectors 304, 306. The vector 304 is an input vector and the vector 306 is an output vector. In an embodiment, the elements in bSack 300 are unordered. An embodiment method of bSack 300 populates all real user data to be processed in a global container first, which may be beneficial, for example, for a graphic processing unit (GPU) environment.

Figure 4:
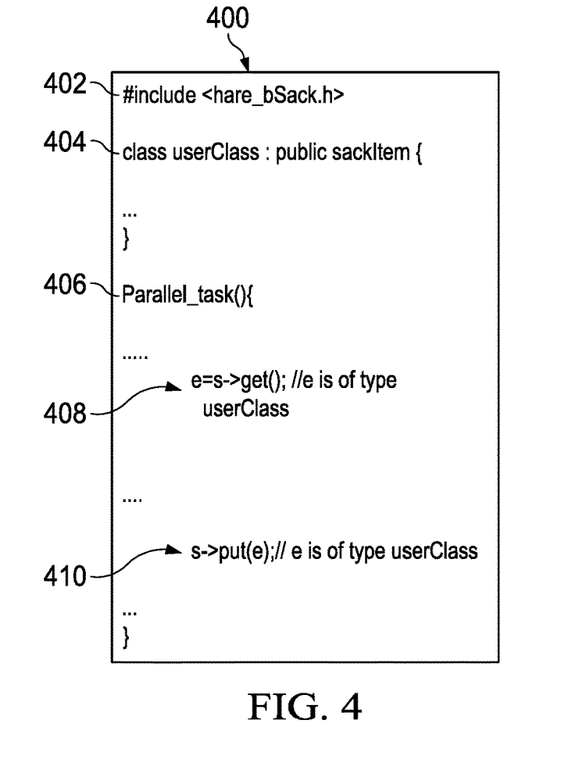
FIG. 4 is a diagram of an embodiment of pseudocode for implementing a bSack.

FIG. 4 is a diagram of an embodiment of pseudocode 400 for a method for using a bSack. The pseudocode 400 includes lines 402, 404, 406, 408, 410. Line 402, "<# include ,hard_bSack.h>" is provided to include a header file. Line 404, "class userClass: public sackitem { . . . }" is to define the userClass, which is derived from a sackItem. Line 406, "Parallel_task( ){" is a sample user task function. Line 408, "e=s->get( ); e is of type userClass" illustrates how get an element from the bSack. Line 410, "s->put(e);// e is of type userClass" illustrates how to put an element into the bSack.

Figure 5:
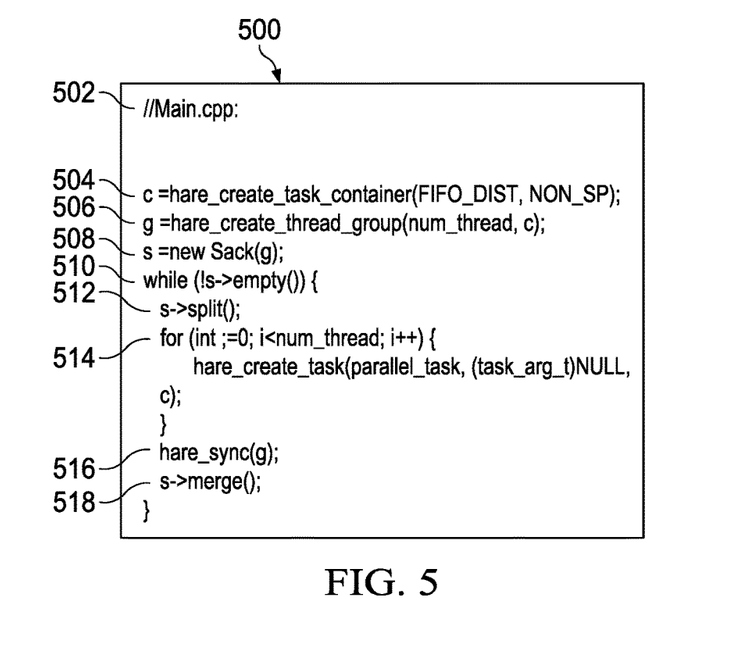
FIG. 5 is a diagram of an embodiment of pseudocode for splitting a global container into local containers and for merging local containers into global containers.

FIG. 5 is a diagram of an embodiment of pseudocode 500 for splitting a global container into local containers and for merging local containers into global containers. Pseudocode 500 illustrates how an end user can use a Sack data structure to perform a BFS algorithm in parallel. Pseudocode 500 includes lines 502, 504, 506, 508, 510,512, 514, 516, and 518. Line 502, "//Main.cpp:" indicates that following code is an example of how a user can use Sack to implement a parallel task. Line 504, "c=hare_create_task_container(FIFO_DIST, NON_SP);" is pseudocode to use the internal runtime to create task container. Line 506, "g=hare_ create_thread_group(num_thread, c);" is pseudocode to use internal runtime to create thread group. Line 508, "s=new Sack(g);" initializes the Sack. Lines 510, "while (!s->empty!{" indicates that lines 512, 514, 516, and 518 will be performed while the Sack is not empty. Line 512, "s->split( );" is pseudocode for splitting items in a global Sack container into local containers. Line 514, "for (int ;=0; i<num_thread; i++){, hare_create_task)parallel_task, (task_arg_t)NULL, c);}" indicates that for each thread in group, create tasks for them and run the tasks to completion. Line 516, "hare_sync(g);" is pseudocode indicating that synchronization is provided in internal runtime. Line 518, "s->merge( );}" is pseudocode to perform a merge when needed. A merge combines all local Sack containers or all items that are contained in local Sack containers, into a global Sack container.

Figure 6:
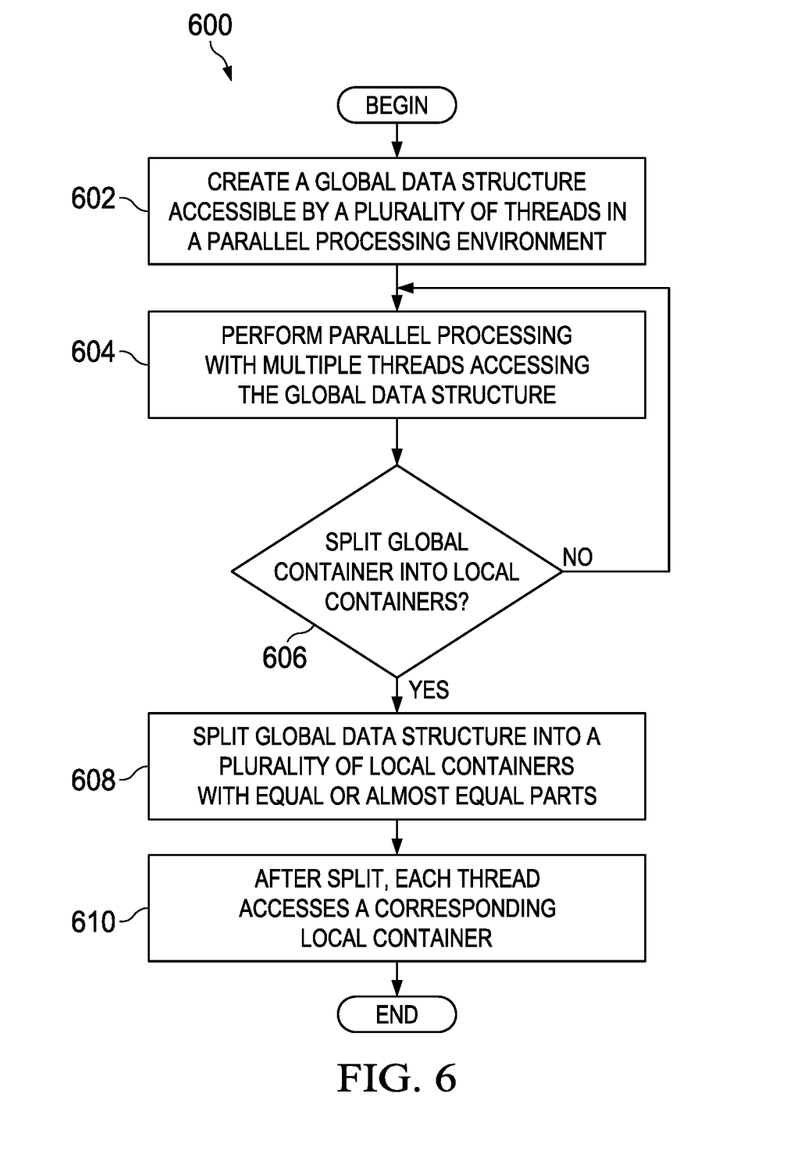
FIG. 6 is a flowchart of an embodiment of a method for operating parallel programs using the disclosed Sack systems and structures.

FIG. 6 is a flowchart of an embodiment of a method 600 for operating parallel programs using the disclosed Sack systems and structures. Method 600 describes an embodiment of a method to split a global container into a plurality of local containers. The method 600 begins at block 602 where a global data structure is created, wherein the global data structure is accessible by a plurality of threads in a parallel processing environment. At block 604, parallel processing is performed, with multiple threads accessing the global data structure. At block 606, it is determined whether to split the global container into local containers. If local containers are not needed, then the method 600 proceeds back to block 604. If local containers are needed, then the method 600 proceeds to block 608 where a global data structure is split into a plurality of local containers with equal or almost equal parts. At block 610, after the split, each thread accesses a corresponding local container.

Figure 7:
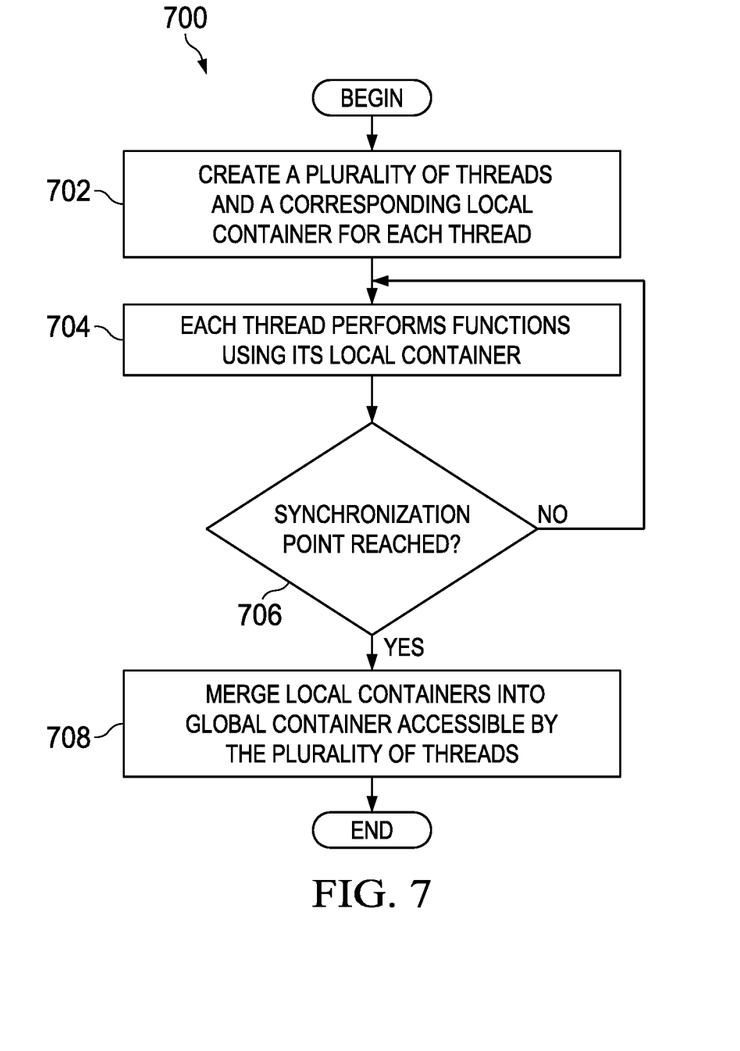
FIG. 7 is a flowchart of an embodiment of a method for operating parallel programs using the disclosed Sack systems and structures.

FIG. 7 is a flowchart of an embodiment of a method 700 for operating parallel programs using the disclosed Sack systems and structures. Method 700 describes an embodiment of a method for merging local containers into a global container. Method 700 begins at block 702 where a plurality of threads and a corresponding local container for each thread are created. At block 704, each thread performs functions using its local container. At block 706, the method 700 determines whether a synchronization point has been reached. If, at block 706, a synchronization point has not been reached, then the method 700 proceeds back to block 704 where each thread continues to perform functions using its local container. If, at block 706, a synchronization point has been reached, then the method 700 proceeds to block 708. At block 708, the local containers are merged into a global container accessible by the plurality of threads, after which, the method 700 may end.

Figure 8:
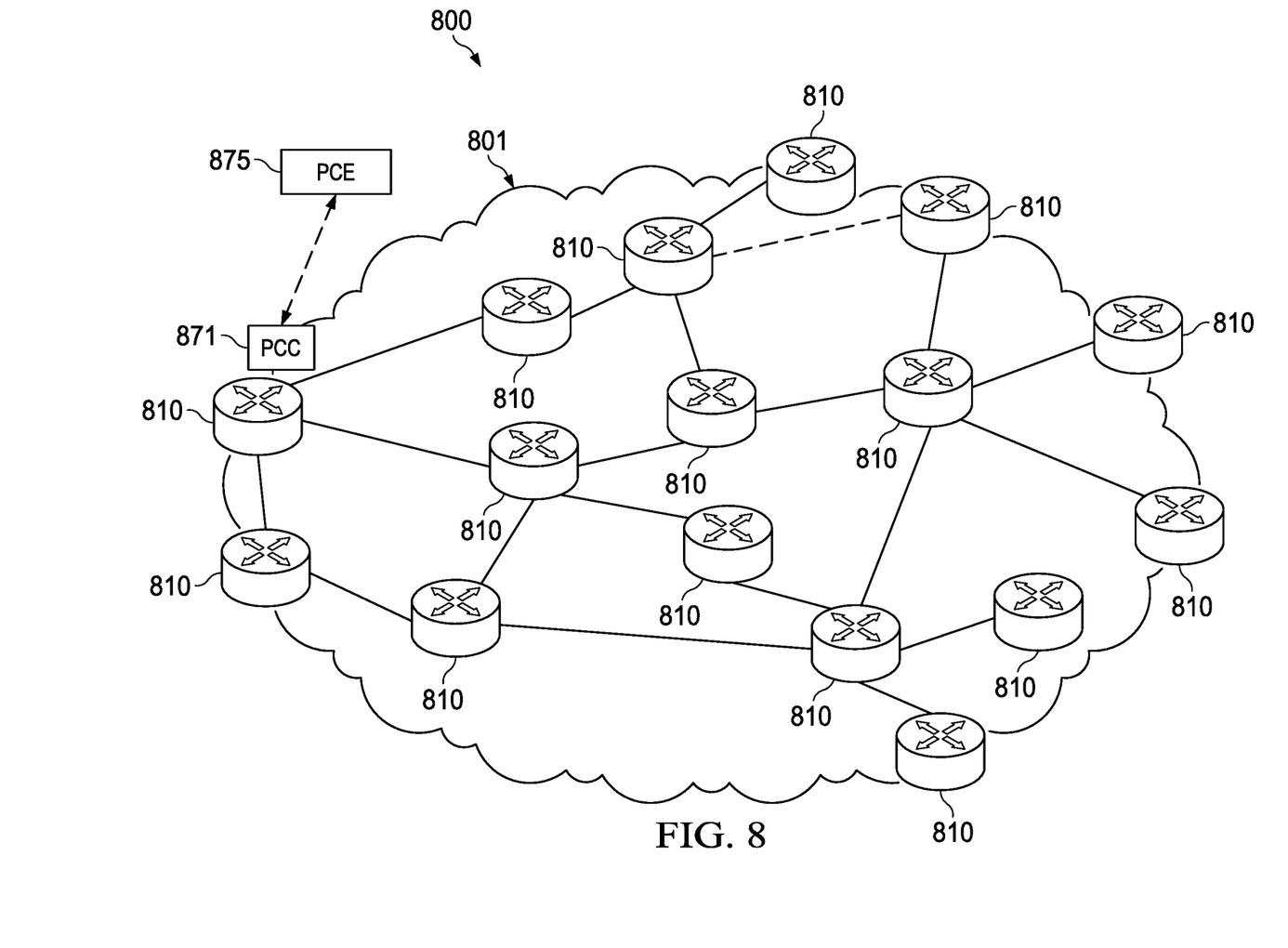
FIG. 8 illustrates an embodiment of a network in which the systems and methods of this disclosure may be implemented.

FIG. 8 illustrates one embodiment of a network 800 in which the systems and methods of this disclosure may be implemented. The network 800 may include a plurality of nodes 810, a path computation element (PCE) 875, and a path computation client (PCC) 871. In an embodiment, the PCE 875 and/or the PCC 871 utilize the disclosed methods and systems for parallel computing and include multi-core processors. In an embodiment the PCE 875 and/or the PCC 871 compute multiple paths for multiple source/destination pairs in parallel. The nodes 810, the PCE 875, and the PCC 871 may communicate with each other through links. The links may be wired links (e.g., optical links, electrical links) or wireless links. The nodes 810 may be any network device capable of establishing connection with and communicating with other devices either wirelessly or via wired connections. In an embodiment, the PCE 875 and/or the PCC 871 may be co-located within one of the nodes 810. Network 800 may be a radio access network (RAN), a backhaul network, an internet backbone network, a combination of multiple types of networks, or any other type of communication network.

A path can be provided by the PCC 871 and/or the PCE 875. For example, the PCC 871 may request a path or route from the PCE 875, which computes the path and forwards the computed path information back to the PCC 871. The path can be a point-to-point (P2P) path, which may include a plurality of nodes and extends from a source node to a target node. The PCC 871 provides the path information or a subset of the path information to one or more nodes 810.

Figure 9:
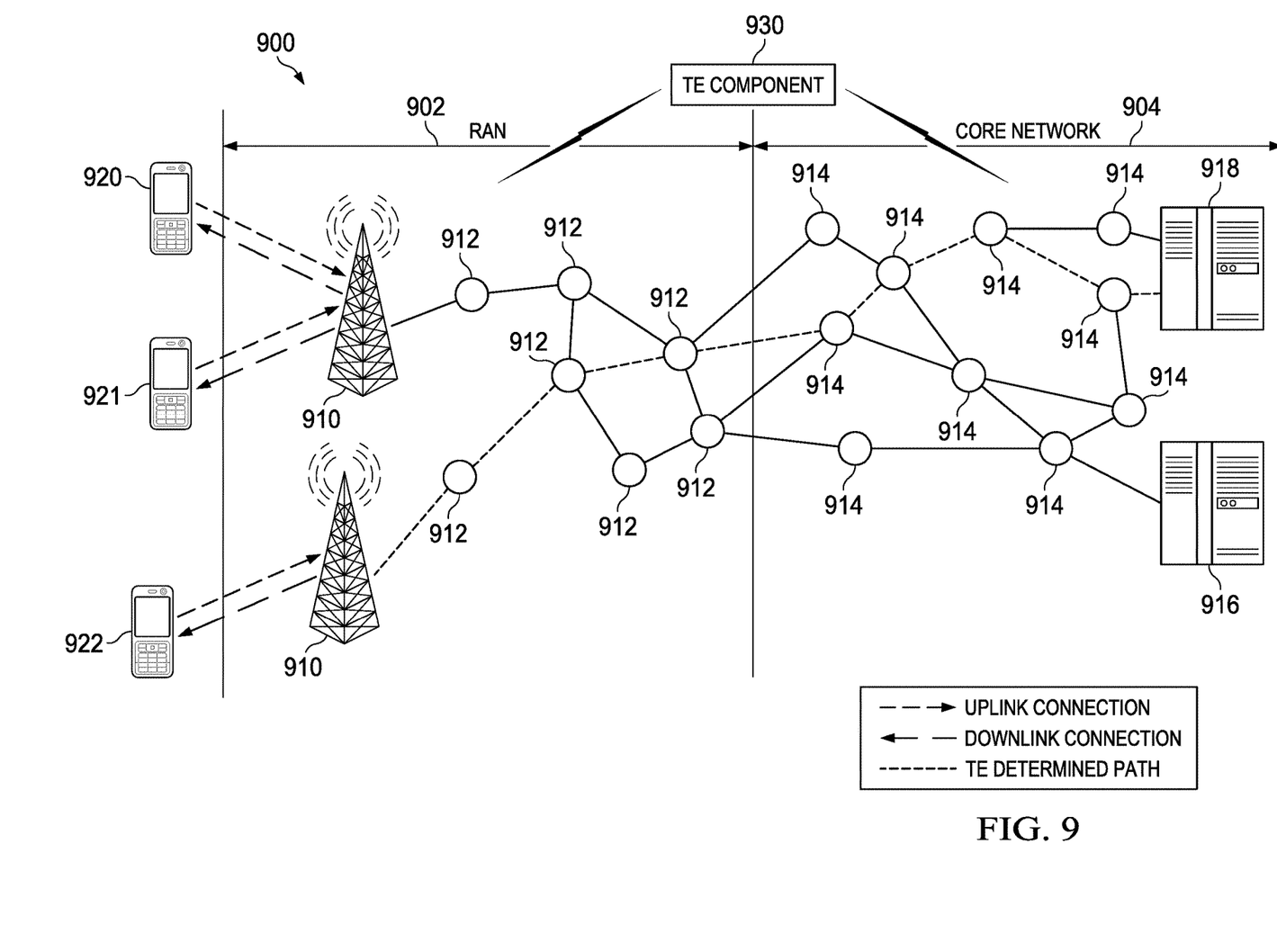
FIG. 9 illustrates an embodiment of a communications network in which the systems and methods described herein may be implemented.

FIG. 9 illustrates an embodiment of a communications network 900 in which the disclosed parallel processing systems and methods may be implemented. The network 900 includes a RAN 902, a core network 904, and a Traffic Engineering (TE) component 930 in communication with one or more components in each of the RAN 902 and the core network 904. The core network 904 and the RAN 902 may comprise software defined networks (SDNs) in some examples. In an embodiment, the TE component 930 may be implemented within one of the core nodes 914 in the core network 904 or one of the RAN nodes 912 in the RAN 902. In an embodiment, the TE component is a logical component and can be implemented on one physical node or in a distributed manner on multiple physical nodes. The RAN 902 includes a plurality of RAN nodes 912 and wireless access points (APs) 910. A plurality of user equipment (UEs) 920, 921, 922 are wirelessly connected to the APs 910. As used herein, the term AP may also be referred to as a transmission point (TP), a base station (BS), or a base transceiver station (BTS) and the four terms may be used interchangeably throughout this disclosure. The APs 910 each may comprise any component capable of providing wireless access by, inter alia, establishing uplink (UL) (dashed line) and/or downlink (DL) (dotted line) connections with the UEs 920, 921, 922, such as a BTS, an enhanced base station (eNB), a femtocell, and other wirelessly enabled devices. The UEs 920, 921, 922 may comprise any component capable of establishing a wireless connection with the APs 910. Examples of UEs include smart phones, tablet computers, and laptops. The RAN nodes 912 connect or otherwise communicably couple the APs 910 to the core network 904. The connections between the RAN nodes 912 may include wired and wireless connections. The RAN nodes 912 may include routers, switches, and gateways.

The core network 904 includes a plurality of core nodes 914 and end point servers 916, 918. In an embodiment, the core network 904 may be the Internet, a local area network (LAN), or a wide area network (WAN). Connections between the core nodes 914 are wired or physical connections, such as fiber optic cables. Examples of core nodes 914 include routers, switches, and servers. Each core node 914 is capable of receiving data from other nodes and transmitting or forwarding data to other nodes.

The TE component 930 includes an interface to other control/management components within the core network 904 and/or the RAN 902. In an embodiment, the TE component 930 includes a multi-core processor that implements the disclosed parallel processing methods and systems. TE component 930 receives TE information from various nodes 912, 914 in the RAN 902 and the core network 904 and provides TE determinations to the nodes 912, 914. In an embodiment, the TE information includes information about both the RAN 902, the core network 904, and the UEs 920, 921, 922. The TE information may include network topology information, which includes routers and UEs in the topology. The TE information may also include TE configuration information, such as, for example, a TE objective, multipath vs. single path information, etc. TE information includes network parameters concerning the core network 904 (i.e., wire-line part), the RAN 902 (i.e., wireless part), as well as other network parameters. The core network 904 (i.e., wire-line) part of the network parameters include information, such as, for example, link capacity and buffer size. The RAN 902 (i.e., wireless) part of the network parameters includes information, such as radio resources at nodes 912, spectral efficiency (SE) over radio links, etc. Other network parameters include per node operating cost, per link operating cost, etc. Other information collected by the TE component 930 include information regarding sources and destinations of data, quality of experience and quality of service (QoE/S) requirement between sources and destinations (e.g., rate, delay, etc.), and service QoE/S feedback.

In an embodiment, the TE component 930 computes a TE decision from the inputs in response to a triggering event. In an embodiment, the TE component 930 computes TE decisions for multiple UEs 920 in parallel. In an embodiment, the TE decision includes end-to-end paths (routes), per route resource and rate allocation. In a second embodiment, the TE decision includes links used for end-to-end routing, and/or per link resource/rate allocation. In a third embodiment, the TE decision includes a mixture of the information included in the first and second embodiments discussed above. The TE component 903 may compute multiple paths or a single path.

Figure 10:
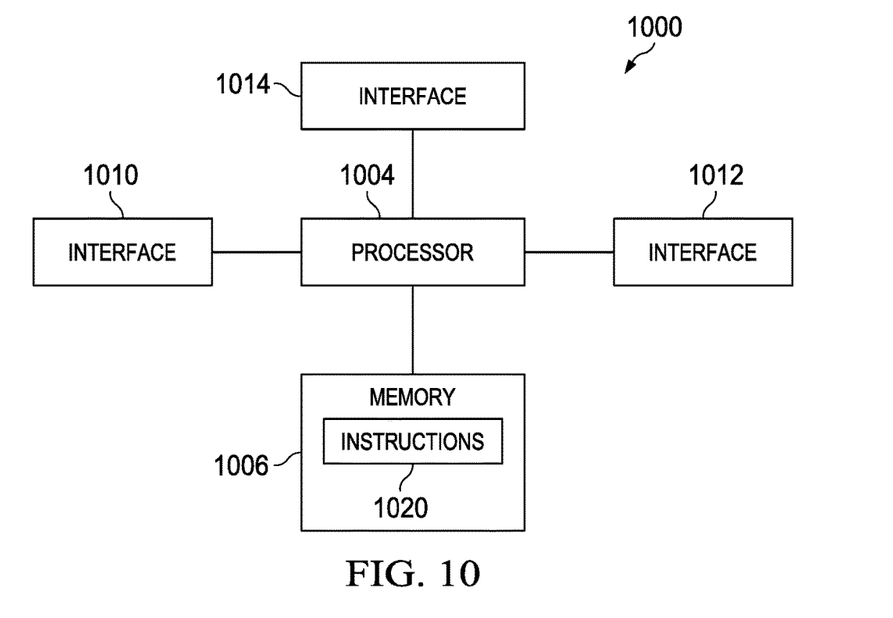
FIG. 10 illustrates a block diagram of an embodiment processing system for performing methods described herein, which may be installed in a host device.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions 1020 for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.). In an embodiment, the processor 1004 includes several processors. In an embodiment, the processor is a multi-core processor.

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1010, 1012, 1014 connects the processing system 1000 to a transceiver adapted to transmit and receive signaling over the telecommunications network.

In an embodiment, the processing system 1000 comprises one or more processors 1004 and a non-transitory computer-readable storage medium 1006 storing instructions 1020. The one or more processors 1004 execute the instructions 1020 to form one or more data structures, each data structure comprising one or more global containers and a plurality of local containers. Each of the global containers is accessible by all of a plurality of threads in a multi-thread parallel processing environment. Each of the plurality of local containers is accessible only by a corresponding one of the plurality of threads. The one or more global containers and the plurality of local containers include a respective serial common data structure. The one or more processors 1004 execute the instructions 1020 to split the global container into a second plurality of local containers when items are going to be processed in parallel. The one or more processors 1004 execute the instructions 1020 to merge two or more local containers into a single global container when a parallel process reaches a synchronization point.

In some embodiments, the one or more global containers and the plurality of local containers support a set of access methods to the data structure comprising one or more of a put( ) method or a push( ) method, a get( ) method or a pop( ) method a split( ) method, or a merge( ) method. In some embodiments, the data structure is array-based, and wherein the supporting comprises supporting the push( ) and pop( ) methods. In some embodiments, the data structure is bit vector-based, and wherein the supporting comprises supporting the put( ) and get( ) methods. In some embodiments, a local container of the plurality of local containers comprises a trace identifier (tid), a start index, and an end index. In some embodiments, the one or more processors 1004 execute the instructions 1020 to execute instructions provided by the one or more global containers and the plurality of local containers to obtain a result, and transmit the result to a node in a network or causing the data processing system to present one or more images, a sound, or a vibration to a user, wherein the result comprises path information for a path across a network from a source node to an end node, and wherein transmitting to a node in the network comprises transmitting at least a portion of the path information to a node in the network, the path information causing the node to facilitate transmitting data from the source node to the end node. In some embodiments, the one or more processors comprise a multi-core processor. In some embodiments, the one or more global containers and the plurality of local containers include a respective serial common data structure.

Figure 11:
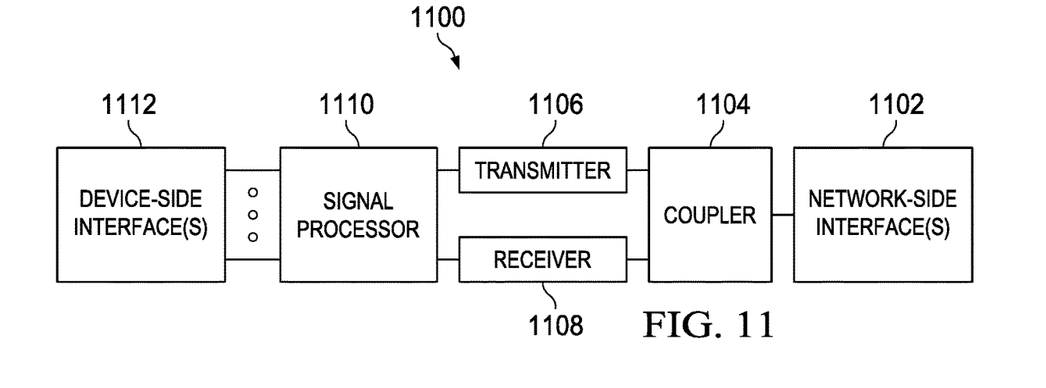
FIG. 11 illustrates a block diagram of a transceiver adapted to transmit and receive signaling over a telecommunications network

FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 900, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety:

[1] Intel® Cilk™ Plus Language Specification, *Part 1 of the Intel® Cilk™ Plus Language Specification version 0.9*;

[2] *Intel® Threading Building Blocks, Containers*, available at: https://www.threadingbuildingblocks.org/docs/help/hh_goto.htm # tbb_userguide/Containers.htm

[3] *Intel® Threading Building Blocks, concurrent_vector*, available at: https://www.threadingbuildingblocks.org/docs/help/hh_goto.htm # tbb_userguide/concurrent_vector_ug.htm

[4] Charles E. Leiserson & Tao B. Schardl, *A Work-Efficient Parallel Breadth—First Search Algorithm*, MIT Computer Science and Artificial Intelligence Laboratory, 32 Vassar Street Cambridge, Mass. 02139.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a data processing system for creating data structures for parallel programming, comprising:

forming, by one or more processors, a first global container including a plurality of local containers, the first global container having a first serial data structure comprising an ordered array-based data structure, the first global container being accessible by all threads of a plurality of threads in a multi-thread parallel processing environment, each local container of the plurality of local containers being accessible only by a corresponding thread of the plurality of threads, each local container of the plurality of local containers comprising a trace identifier (tid), a start index, and an end index, the tid identifying the corresponding thread, the start index and the end index identifying a corresponding data region of the first global container, each local container of the plurality of local containers having a same second serial data structure different from the first serial data structure of the first global container;

splitting the first global container into a second plurality of local containers when items in the first global container are to be processed in parallel;

executing a parallel process by the plurality of threads, each thread of the plurality of threads data stored in the corresponding data region of the each thread during the parallel process;

merging two or more local containers into a second global container when the parallel process reaches a synchronization point;

executing instructions provided by at least one of the first and second global containers to obtain a result; and transmitting the result to a node in a network, the result comprising path information for a path across the network from a source node to an end node, the transmitting comprising transmitting at least a portion of the path information to the node, the path information causing the node to facilitate transmitting data from the source node to the end node.

2. The method of claim 1, wherein the first and second global containers and the plurality of local containers support a set of access methods to the data structures comprising one or more of:
   a push( ) method;
   a pop( ) method;
   a split( ) method; and
   a merge( ) method.

3. The method of claim 1, wherein the one or more processors comprise a multi-core processor.

4. The method of claim 1, wherein the first and second global containers and the plurality of local containers include a respective serial common data structure.

5. The method of claim 1, wherein executing the instructions further comprises executing instructions provided by the merged local containers.

6. The method of claim 1, wherein executing the instructions comprises executing instructions provided by the first global container.

7. The method of claim 1, wherein executing the instructions comprises executing instructions provided by the second global container.

8. The method of claim 1, wherein the transmitting comprises transmitting the result to the node in the network and causing the data processing system to present one or more images, a sound, or a vibration to a user.

9. A data processing system for creating data structures for parallel programming comprising:
   one or more processors; and
   a non-transitory computer readable storage medium storing programming for execution by the processor, the programming including computer instructions for:
      forming a first global container including a plurality of local containers, the first global container having a first serial data structure comprising an ordered array-based data structure, the first global container being accessible by all threads of a plurality of threads in a multi-thread parallel processing environment, each local container of the plurality of local containers being accessible only by a corresponding thread of the plurality of threads, each local container of the plurality of local containers comprising a trace identifier (tid), a start index, and an end index, the tid identifying the corresponding thread, the start index and the end index identifying a corresponding data region of the first global container, each local container of the plurality of local containers having a same second serial data structure being different from the first serial data structure of the first global container;
      splitting the first global container into a second plurality of local containers when items in the first global container are to be processed in parallel;
      executing a parallel process by the plurality of threads, each thread of the plurality of threads processing data stored in the corresponding data region of the each thread during the parallel process;
      merging two or more local containers into a second global container when the parallel process reaches a synchronization point;
      executing instructions provided by at least one of the first and second global containers to obtain a result; and
      transmitting the result to a node in a network,
      the result comprising path information for a path across the network from a source node to an end node, the transmitting comprising transmitting at least a portion of the path information to the node, the path information causing the node to facilitate transmitting data from the source node to the end node.

10. The data processing system of claim 9, wherein the first and second global containers and the plurality of local containers support a set of access methods to the data structures comprising one or more of:
    a push( ) method;
    a pop( ) method;
    a split( ) method; and
    a merge( ) method.

11. The data processing system of claim 9, wherein the one or more processors comprise a multi-core processor.

12. The data processing system of claim 9, wherein the first and second global containers and the plurality of local containers include a respective serial common data structure.

13. The data processing system of claim 9, wherein executing the instructions further comprises executing instructions provided by the merged local containers.

14. The data processing system of claim 9, wherein the transmitting comprises transmitting the result to the node in the network and causing the data processing system to present one or more images, a sound, or a vibration to a user.

15. A non-transitory computer-readable media storing computer instructions for creating data structures for parallel programming in a data processing system, that when executed by one or more processors, cause the one or more processors to perform the steps of:
   forming a first global container including a plurality of local containers, the first global container having a first serial data structure comprising an ordered array-based data structure, the first global container being accessible by all threads of a plurality of threads in a multi-thread parallel processing environment, each local container of the plurality of local containers being accessible only by a corresponding thread of the plurality of threads, each local container of the plurality of local containers comprising a trace identifier (tid), a start index, and an end index, the tid identifying the corresponding thread, the start index and the end index identifying a corresponding data region of the first global container, each local container of the plurality of local containers having a same second serial data structure, the second serial common data structure being different from the first serial common data structure of the first global container;
   splitting the first global container into a second plurality of local containers when items in the first global container are to be processed in parallel;
   executing a parallel process by the plurality of threads, each thread of the plurality of threads processing data stored in the corresponding data region of the each thread during the parallel process;
   merging two or more local containers into a second global container when the parallel process reaches a synchronization point;
   executing instructions provided by at least one of the first and second global containers to obtain a result; and
   transmitting the result to a node in a network, the result comprising path information for a path across the network from a source node to an end node, the transmitting comprising transmitting at least a portion of the path information to the node, the path information causing the node to facilitate transmitting data from the source node to the end node.

16. The non-transitory computer-readable media of claim 15, wherein the first and second global containers and the plurality of local containers support a set of access methods to the data structures comprising one or more of:
   a push( ) method;
   a pop( ) method;
   a split( ) method; and
   a merge( ) method.

17. The non-transitory computer-readable media of claim 15, wherein the one or more processors comprise a multi-core processor.

18. The non-transitory computer-readable media of claim 15, wherein the first and second global containers and the plurality of local containers include a respective serial common data structure.

19. The data processing system of claim 9, wherein the first global container and the second global container are different containers.

20. The data processing system of claim 9, wherein the first global container and the second global container are the same containers.

21. The method of claim 1, wherein the merging the two or more local containers into the second global container is performed after executing a portion of the parallel process, and further comprising:
   after merging the two or more local containers into the second global container, continuing execution of the parallel process by the plurality of threads.

22. The data processing system of claim 9, wherein the computer instructions for merging the two or more local containers into the second global container are performed after executing a portion of the parallel process, and wherein the programming includes further computer instructions for:
   after merging the two or more local containers into the second global container, continuing execution of the parallel process by the plurality of threads.

23. The non-transitory computer-readable media of claim 15, wherein the computer instructions for merging the two or more local containers into the second global container are performed after executing a portion of the parallel process, and wherein the non-transitory computer-readable media further stores computer instructions that cause the one or more processors to perform the steps of:
   after merging the two or more local containers into the second global container, continuing execution of the parallel process by the plurality of threads.

24. The data processing system of claim 15, wherein the transmitting comprises transmitting the result to the node in the network and causing the data processing system to present one or more images, a sound, or a vibration to a user.

* * * * *

UNITED STATES PATENT AND TRADEMARK OFFICE
CERTIFICATE OF CORRECTION

PATENT NO. : 10,585,845 B2
APPLICATION NO. : 15/293413
DATED : March 10, 2020
INVENTOR(S) : Liya Chen et al.

Page 1 of 1

It is certified that error appears in the above-identified patent and that said Letters Patent is hereby corrected as shown below:

In the Claims

In Column 14, Line 59, Claim 1, delete "plurality of threads data" and insert --plurality of threads processing data--.

In Column 16, Line 52, Claim 15, delete "the second serial common data structure".

In Column 16, Line 53, Claim 15, delete "common".

Signed and Sealed this
Eleventh Day of August, 2020

Andrei Iancu
*Director of the United States Patent and Trademark Office*